May 1, 1928.

F. R. PETERS 1,668,334

BOOSTER ENGINE CYLINDER COCK

Filed Nov. 16, 1925

Inventor
Frank R. Peters
By his Attorneys

May 1, 1928.  
F. R. PETERS  
1,668,334  
BOOSTER ENGINE CYLINDER COCK  
Filed Nov. 16, 1925  
2 Sheets-Sheet 2
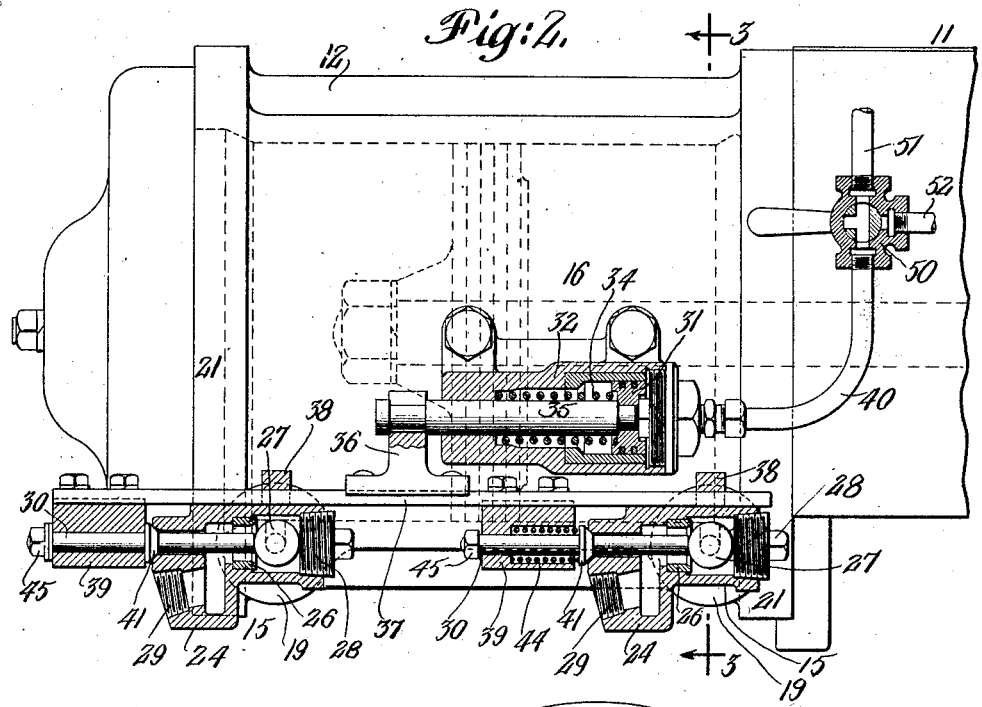
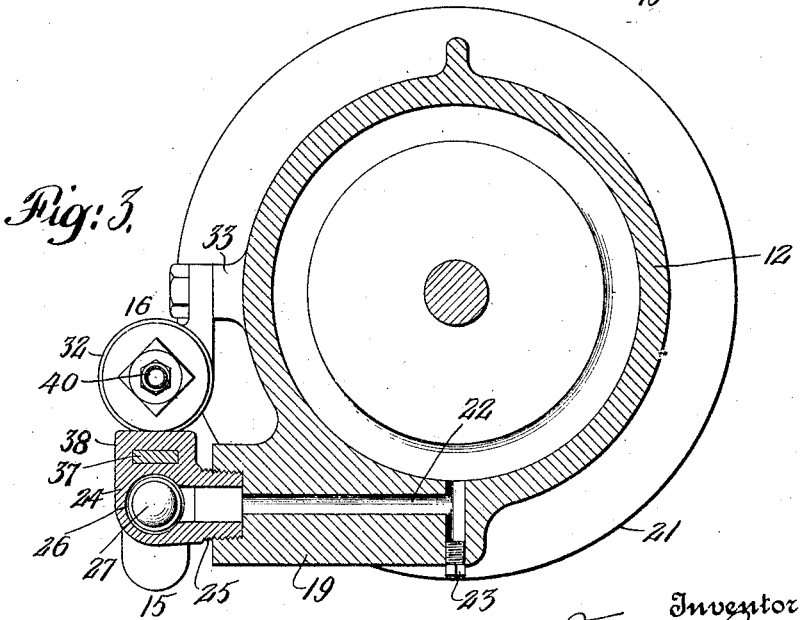
Inventor  
Frank R. Peters  
By his Attorneys Patented May 1, 1928.

1,668,334

UNITED STATES PATENT OFFICE.

FRANK RICHARD PETERS, OF NEW YORK, N. Y., ASSIGNOR TO FRANKLIN RAILWAY SUPPLY COMPANY, OF NEW YORK, N. Y., A CORPORATION OF DELAWARE.

BOOSTER-ENGINE CYLINDER COCK.

Application filed November 16, 1925. Serial No. 69,247.

My invention relates to booster engine cylinder cocks. I aim to provide railway booster cylinders with cocks (for draining them of water, etc.) in such a way as to obviate danger of such cocks being broken off or injured in service; to prevent steam or water from blowing out objectionably when the cylinder cocks are open; and to assure proper clearing out and warming of the booster cylinders before the cocks are closed. How these and other advantages can be realized through my invention will appear from my description hereinafter of a selected and preferred embodiment.

In the drawings:—

Fig. 2 is a side view of the booster cylinder, on a much larger scale than Fig. 1, with the cylinder cocks and various accessory parts in vertical longitudinal mid-section.

Fig. 3 shows a cross section through the cylinder and one of the cylinder cocks, taken as indicated by the line 3—3 in Fig. 2.

Figure 1:
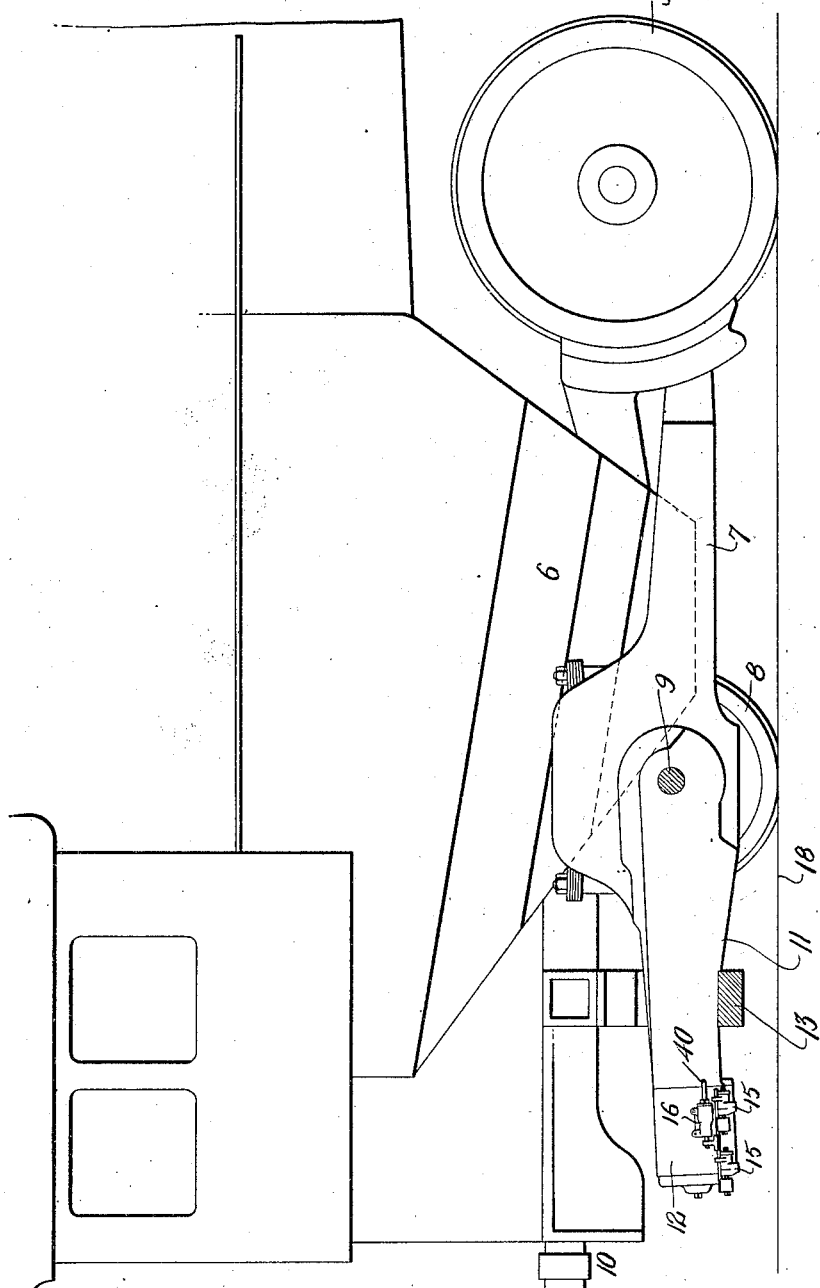
Fig. 1 is a fragmentary side view (somewhat diagrammatic) of the rear portion of a steam locomotive, with a booster applied to its trailer truck and equipped with my invention,—certain parts being shown in section.

Fig. 1 shows the rear portion of a steam locomotive, including one of the drivers 5, the ash pan 6, the trailer truck 7, with its wheel 8 and axle 9, and also the rear portion of the locomotive frame and the draw bar pocket structure, indicated by the reference character 10. A booster 11 is shown applied to the trailer truck axle 9, and extending rearward therefrom, with its cylinders at 12 beneath the structure 10. The booster 11 may be additionally supported by the truck frame structure indicated at 13. The booster cylinder cocks 15, 15 and their operating mechanism 16 are shown constructed, mounted, and arranged in accordance with my present invention.

Owing to the relatively small size of the trailer truck wheels 8 as compared with the drivers 5 and the consequent closeness of the booster-driven axle 11 to the rails (whose tops are indicated at 18), as well as to the necessary proportions and position of the structure 10, the problem of finding sufficient space for the booster 10 is not an easy one. It is especially difficult to provide adequate clearance between the bottom of the booster cylinder structure 12 and the rails 18; accordingly, the application of cylinder cocks to the booster cylinders 12 has heretofore involved excessive risk of their being damaged and rendered inoperative, or even broken off altogether.

As shown in Figs. 1 to 3, I mount the cylinder cocks 15, 15, beside the booster cylinders at 12, instead of directly beneath them, as heretofore. In this way, I not only reduce the vertical space required to accommodate the booster and simplify the problem of adequate clearances, but also make the cylinder structure 12 afford the cocks 15, 15, a measure of shelter and protection from being struck: i. e., with the bottom line of the cylinder cocks 15, 15, about level with or above that of the cylinder structure, the latter will be struck by anything which might otherwise strike the cylinder cocks. In the present instance, I have also mounted operating mechanism 16 for the cylinder cocks 15, 15 beside the cylinders 12, well above their bottom. When mounted at the outer sides of the cylinder 12, as shown, the cocks 15, 15 and their operating mechanism 16 are not only in a protected situation, as compared with their usual position directly beneath the cylinder, but are even more conveniently accessible, for inspection, repair, labor, or any other purpose.

As shown in Fig. 3, each cylinder 12 is provided with a hollow or channelled lateral boss 19 at its lower side, somewhat above its end flanges 21, however. This boss 19 extends to the outer side of the cylinder. As shown, there is a clean-out opening with a plug 23 directly below the cylinder, opposite the opening from the latter into the boss 19. The cylinder cock or valve casings 24 extend parallel with the cylinder 12, and their inlet necks 25 are screwed into the outer ends of the bosses 19. Each valve body or casing 24 is provided with a removable seat 26 for a ball valve 27. This ball 27 and its seat 26 are accessible and removable through clean-out openings with plugs 28 in the end of the body 24, directly opposite the seats. Beyond the seats 26, the passage through the body 24 extends downward to an outlet 29, shown as internally screw threaded to take a pipe (not shown) leading to any convenient point of discharge, such as the locomotive ash pan. During the operation of the booster 11, the ball valve 27 is normally held tight on its seat 26 by the pressure from the cylinder 12; but when steam is off, or it is desired to drain or blow out the cylinder, the valve is pushed and held off its seat by a rod 30 operating in a bore through the end of the casing 24.

In the present instance, the operating mechanism 16 for the cock 15 is of a spring and pressure actuated type, comprising (Figs. 2 and 3) a piston 31 arranged to operate in a cylinder 32 bolted to a boss 33 on one side of the booster cylinder 12, with a helical compression spring 34 acting between the piston 31 and the other end of the cylinder 32. The rod 35 of the piston 31 is connected directly to a head 36 on an actuating bar part 37 that is shiftable longitudinally in guide yokes 38 cast on the tops of the cylinder cock casings 24. The bar 37 acts on the valve-operating rods 30 through blocks 39 carried by the bar, as hereinafter more fully described. The piston 31 and the bar 37 are urged to the right (Figs. 1 and 2) by the spring 34, so as to push and hold open the valves 27, 27, as shown in Fig. 2; to close the valves 27, 27, the piston 31 is shifted to the left against the spring 34, by pressure admitted to the righthand end of the cylinder 32 through a pipe connection 40.

As shown in Fig. 2, each valve-operating rod 30 is provided with a conical valve disc 41 adapted to seat on a corresponding conical seat in the end of the valve body 24, so as to prevent steam or water from blowing out around said rod 30 when the valve 27 is open. The object of this is to restrict the discharge from the cylinders through the blow-off cocks to the connections (not shown) from the outlets 29, and obviate inconvenience or injury to persons who may be standing near when the cylinder cocks 15, 15 are opened. To insure that both valves 41, 41, shall always seat fully, the operating connections to the rods 30 may be arranged to afford a differential cushion. As shown, this is provided by means of a helical compression spring 44 interposed between one of the blocks 39 and the corresponding rod 30 which extends loosely therethrough. This spring 44 is housed in an enlarged bore or recess in the block 39, around the rod 30, and acts between the bottom of this recess and the valve disc 31. The outer end of the rod 30 is provided with a head in the form of a nut 45, beyond the block 39. The other rod 30 is fastened tight in the corresponding block 39, which is clamped between the corresponding valve disc 31 and nut 45.

Pressure to shift the rods 30, 30 to the left and permit the valves 27, 27 to close may be supplied to the cylinder 32 by connecting the pipe 40 either to the usual air pressure control system of the booster, or to any other suitable source of pressure. As shown, a three-way control valve 50 is connected to the pipe 40; it has a supply connection 51, and an exhaust connection 52.

With a spring 34 of suitable scale relative to the area of the piston 31 and the size of the supply connection at 40, an appreciable interval (which may be varied, as desired, by varying the effective area of the supply connection) will elapse between the starting of the booster 11 and the building up of sufficient pressure in the cylinder 32 to overcome the spring. This interval will allow the booster cylinder 12 to be cleared of water completely (and even warmed up by blowing steam therethrough) before the cylinder cocks 15, 15 are actually closed.

What I claim is:—

1. The combination with a railway vehicle axle, of a booster mounted on said axle with its cylinders correspondingly close to the rails, and cylinder cocks therefor beside said booster cylinders, above the bottom thereof.

2. The combination with a railway vehicle axle, of a booster mounted on said axle with its cylinders correspondingly close to the rails, and cylinder cocks with pressure actuating means therefor mounted at the outer sides of said booster cylinders, above the bottom thereof.

3. The combination with a railway vehicle axle, of a booster mounted on said axle with its cylinders correspondingly close to the rails, cylinder cocks therefor beside said booster cylinders, above the bottom thereof, with longitudinally movable actuating means for said cocks, and a fluid pressure motor for operating said actuating means, mounted alongside the cylinders above the latter.

4. The combination with a railway vehicle axle, of a booster mounted on said axle, with its cylinders correspondingly close to the rails, cylinder cocks with pressure actuating means therefor, yielding actuating rods for opening said cocks, and valves on said rods for preventing blow-off around the rods when the cocks are opened.

5. The combination with a railway vehicle axle, of a booster mounted on said axle with its cylinders correspondingly close to the rails, cylinder cocks for said booster cylinders, actuating rods for opening said cocks, with valves thereon for preventing blow-off around the rods when the cocks are opened, and means for mechanically actuating said rods affording a differential cushion for the valves to insure full seating of both.

In testimony whereof I have hereunto signed my name.

FRANK RICHARD PETERS.